US009424526B2

(12) United States Patent
Ranjbar

(10) Patent No.: US 9,424,526 B2
(45) Date of Patent: Aug. 23, 2016

(54) QUANTUM PROCESSOR BASED SYSTEMS AND METHODS THAT MINIMIZE A CONTINUOUS VARIABLE OBJECTIVE FUNCTION

(71) Applicant: D-Wave Systems Inc., Burnaby (CA)

(72) Inventor: Mani Ranjbar, Burnaby (CA)

(73) Assignee: D-WAVE SYSTEMS INC., Burnaby (CA)

( * ) Notice: Subject to any disclaimer, the term of this patent is extended or adjusted under 35 U.S.C. 154(b) by 244 days.

(21) Appl. No.: 14/280,204

(22) Filed: May 16, 2014

(65) Prior Publication Data

US 2014/0344322 A1 Nov. 20, 2014

Related U.S. Application Data

(60) Provisional application No. 61/824,881, filed on May 17, 2013.

(51) Int. Cl.
G06F 17/11 (2006.01)
G06N 99/00 (2010.01)
B82Y 10/00 (2011.01)

(52) U.S. Cl.
CPC ............. G06N 99/002 (2013.01); B82Y 10/00 (2013.01); G06F 17/11 (2013.01)

(58) Field of Classification Search
None
See application file for complete search history.

(56) References Cited

U.S. PATENT DOCUMENTS

| | | | |
|---|---|---|---|
| 5,113,352 A * | 5/1992 | Finnerty | G06F 17/5072 716/105 |
| 7,135,701 B2 | 11/2006 | Amin et al. | |
| 7,418,283 B2 | 8/2008 | Amin | |
| 7,533,068 B2 | 5/2009 | Maassen van den Brink et al. | |
| 7,788,192 B2 | 8/2010 | Amin | |
| 7,843,209 B2 | 11/2010 | Berkley | |
| 7,876,248 B2 | 1/2011 | Berkley et al. | |
| 7,877,333 B2 * | 1/2011 | Macready | G06N 7/08 706/10 |
| 7,984,012 B2 | 7/2011 | Coury et al. | |
| 8,008,942 B2 | 8/2011 | van den Brink et al. | |
| 8,018,244 B2 | 9/2011 | Berkley | |
| 8,035,540 B2 | 10/2011 | Berkley et al. | |
| 8,073,808 B2 | 12/2011 | Rose | |
| 8,098,179 B2 | 1/2012 | Bunyk et al. | |
| 8,169,231 B2 | 5/2012 | Berkley | |
| 8,174,305 B2 | 5/2012 | Harris | |
| 8,190,548 B2 | 5/2012 | Choi | |

(Continued)

FOREIGN PATENT DOCUMENTS

WO 2012/064974 A2 5/2012
WO 2013/006836 A1 1/2013

OTHER PUBLICATIONS

Bocko et al., "Prospects for Quantum Coherent Computation Using Superconducting Electronics," *IEEE Transactions on Applied Superconductivity* 70(2):3638-3641, Jun. 1997.

(Continued)

*Primary Examiner* — Matthew Sandifer
(74) *Attorney, Agent, or Firm* — Seed IP Law Group PLLC

(57) ABSTRACT

Computational techniques for mapping a continuous variable objective function into a discrete variable objective function problem that facilitate determining a solution of the problem via a quantum processor are described. The modified objective function is solved by minimizing the cost of the mapping via an iterative search algorithm.

13 Claims, 3 Drawing Sheets

(56) References Cited

U.S. PATENT DOCUMENTS

| | | |
|---|---|---|
| 8,195,596 B2 | 6/2012 | Rose et al. |
| 8,244,662 B2 | 8/2012 | Coury et al. |
| 8,421,053 B2 | 4/2013 | Bunyk et al. |
| 8,700,689 B2 | 4/2014 | Macready et al. |
| 2008/0052055 A1 | 2/2008 | Rose et al. |
| 2012/0094838 A1 | 4/2012 | Bunyk et al. |
| 2014/0187427 A1* | 7/2014 | Macready ............ G06N 99/002 505/170 |

OTHER PUBLICATIONS

Clarke et al., "Superconducting quantum bits," *Nature 453*:1031-1042, Jun. 19, 2008.

Devoret et al. "Superconducting Qubits: A Short Review," arXiv:cond-mat/0411174v1, Nov. 7, 2004, 41 pages.

Devoret et al., "Superconducting Circuits for Quantum Information: An Outlook," *Science 339*:1169-1174, Mar. 8, 2013.

Friedman et al., "Quantum superposition of distinct macroscopic states," *Nature 406*:43-46, Jul. 6, 2000.

Harris et al., "Experimental Demonstration of a Robust and Scalable Flux Qubit," arXiv:0909.4321v1, Sep. 24, 2009, 20 pages.

Makhlin, "Quantum-state engineering with Josephson-junction devices," *Reviews of Modern Physics 73*(2):357-400, Apr. 2001.

Martinis, "Superconducting Phase Qubits," *Quantum Information Processing 8*(2-3):81-103, Jun. 2009.

Mooij et al., "Josephson Persistent-Current Qubit," *Science 285*:1036-1039, Aug. 13, 1999.

Orlando et al., "Superconducting persistent-current qubit," *Physical Review B 60*(22):15398-15413, Dec. 1, 1999.

Ranjbar, "Quantum Processor Based Systems and Methods That Minimize a Continous Variable Objective Function," U.S. Appl. No. 61/824,881, filed May 17, 2013, 35 pages.

Zagoskin et al., "Superconducting Qubits," *La Physique Au Canada 63*(4):215-227, 2007.

* cited by examiner

QUANTUM PROCESSOR BASED SYSTEMS AND METHODS THAT MINIMIZE A CONTINUOUS VARIABLE OBJECTIVE FUNCTION

BACKGROUND

Field

The present systems and methods generally relate to use of quantum processors, and particularly relate to the use of quantum processors to minimize an objective function comprising non-binary variables.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information are active areas of research and define classes of vendible products. A quantum computer is a system that makes direct use of quantum-mechanical phenomena, such as, superposition, tunneling, and entanglement, to perform operations on data. The elements of a quantum computer are not binary digits (bits) but typically are quantum binary digits or qubits. Quantum computers hold the promise of providing exponential speedup for certain classes of computation problems like simulating quantum physics. Useful speedup may exist for other classes of problems.

There are several types of quantum computers. An early proposal from Feynman in 1981 included creating artificial lattices of spins. More complicated proposals followed including a quantum circuit model where logical gates are applied to qubits in a time ordered fashion. In 2000 a model of computing was introduced for solving satisfiability problems; based on the adiabatic theorem this model is called adiabatic quantum computing. This model is believed useful for solving hard optimization problems and potentially other problems.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between initial Hamiltonian and final Hamiltonian. An example is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution.

If the evolution is too fast, then the system can be excited to a higher energy state, such as the first excited state. In the present systems and methods, an "adiabatic" evolution is an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1. Generally the initial Hamiltonian $H_i$ and the final Hamiltonian $H_f$ don't commute. That is, $[H_i, H_f] \neq 0$.

The process of changing the Hamiltonian in adiabatic quantum computing may be referred to as evolution. The rate of change, for example the change in variable s, sometimes referred to as an evolution or annealing schedule, is slow enough that the system is always in the instantaneous ground state of the evolution Hamiltonian during the evolution, and transitions at anti-crossings (i.e., when the gap size is smallest) are avoided. The example of a linear evolution schedule is given above. Other evolution schedules are possible including non-linear, parametric, and the like. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an (sing spin glass) and therefore quantum annealing may be used to find the solution to such a hard problem. Adiabatic quantum computation, therefore, may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa with appropriate changes. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P,$$

where A(t) and B(t) are time dependent envelope functions. For example, A(t) changes from a large value to substantially zero during the evolution. The Hamiltonian $H_E$ may be thought of as an evolution Hamiltonian similar to $H_e$ described in the context of adiabatic quantum computation above. The disorder is slowly removed by removing $H_D$ (i.e., reducing A(t)). The disorder may be added and then removed. Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The changed in the evolution Hamiltonian in quantum annealing may follow a defined schedule known as an annealing schedule. Unlike adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. A qubit and a coupler resemble each other but differ in physical parameters. One difference is the parameter, β. Consider an rf-SQUID, superconducting loop interrupted by Josephson junction, β is the ratio of the inductance of a Josephson junctions in to the geometrical inductance of the loop. A design with lower values of β, about 1, behaves more like a simple inductive loop, a monostable device. A design with higher values is more dominated by the Josephson junctions, and is more likely to have bistable behavior. The parameter, β is defined a $2\pi LI_C/\Phi_0$. That is, β is proportional to the product of inductance and critical current. One can vary the inductance, for example, a qubit is normally larger than its associated coupler. The larger device has a larger inductance and thus the qubit is often a bistable device and a coupler monostable. Alternatively the critical current can be varied, or the product of the critical current and inductance can be varied. A qubit often will have more devices associated with it. Further details and embodiments of exemplary quantum processors that may be used in conjunction with the present systems and methods are described in, for example, the following US Patents and Patent Application Publications: U.S. Pat. Nos. 7,533,068; 8,008,942; 2008-0176750 (now U.S. Pat. No. 8,195,596); 2009-0121215 (now U.S. Pat. No. 8,190,548); and 2011-0022820 (now U.S. Pat. No. 8,421,053).

The types of problems that may be solved by any particular embodiment of a quantum processor, as well as the relative size and complexity of such problems, typically depend on many factors. Two such factors may include the number of qubits in the quantum processor and the connectivity (i.e., the availability of communicative couplings) between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of directly communicably coupling to up to three other qubits without any intervening qubits. In other words, there are direct communicative coupling paths available to three other qubits, although in any particular application all or less than all of those communicative coupling paths may be employed. In a quantum processor employing coupling devices between qubits, this would mean a qubit having a connectivity of three is selectively communicably coupleable to each of three other qubits via a respective one of three coupling devices. Typically, the number of qubits in a quantum processor limits the size of problems that may be solved and the connectivity between the qubits in a quantum processor limits the complexity of the problems that may be solved.

Many techniques for using quantum annealing and/or adiabatic quantum computation to solve computational problems involve finding ways to directly map a representation of a problem to the quantum processor itself. For example, US Patent Publication 2008-0052055 describes solving a protein folding problem by first casting the protein folding problem as an Ising spin glass problem and then directly mapping the Ising spin glass problem to a quantum processor, and US Patent Publication 2008-0260257 (now U.S. Pat. No. 8,073,808) describes solving a computational problem (e.g., an image-matching problem) by first casting the problem as a quadratic unconstrained binary optimization ("QUBO") problem and then mapping the QUBO problem directly to a quantum processor. In both cases, a problem is solved by first casting the problem in a contrived formulation (e.g., Ising spin glass, QUBO, etc.) because that particular formulation maps directly to the particular embodiment of the quantum processor being employed. In other words, an intermediate formulation is used to re-cast the original problem into a form that accommodates the number of qubits and/or connectivity constraints in the particular quantum processor and then the intermediate formulation is directly mapped to the quantum processor. This "direct mapping" approach is motivated, at least in part, by limitations inherent in the architecture of the quantum processor being employed. For example, a quantum processor that employs only pair-wise interactions between qubits (i.e., a quantum processor employing coupling devices that provide communicative coupling between respective pairs of qubits but not, for example, between larger sets of qubits, such as three or more qubits) is intrinsically well-suited to solve problems having quadratic terms (e.g., QUBO problems) because quadratic terms in a problem map directly to pair-wise interactions between qubits in the quantum processor.

Quadratic Unconstrained Binary Optimization Problems

A quadratic unconstrained binary optimization ("QUBO") problem is a form of discrete optimization problem that involves finding a set of N binary variables $\{x_i\}$ that minimizes an objective function of the form:

$$E(x_1, \ldots, x_N) = \sum_{i \leq j}^{N} Q_{ij} x_i x_j$$

where Q is typically a real-valued upper triangular matrix that is characteristic of the particular problem instance being studied. QUBO problems arise in many different fields, for example machine learning, pattern matching, economics and finance, and statistical mechanics, to name a few.

Programming a Quantum Processor

A quantum processor may interact with a digital computer and may be programmed and/or operated via instructions sent from the digital computer. However, the way in which the quantum processor is programmed, and how its operation is involved in an algorithm for solving a problem, may depend on many factors. As described in PCT Patent Application Serial No. PCT/US2012/045843 (now WIPO publication WO/2013/006836) and in accordance with the present systems and methods, a quantum processor may be programmed and operated to determine a solution to a computational problem via at least two approaches: a direct mapping approach and a sampling approach.

Direct Mapping Approach

A problem may comprise a number of variables, and using the direct mapping approach to solve the problem, each variable may be mapped to and/or represented by at least one qubit in a quantum processor. The types of problems that may be solved by this approach, as well as the relative size and complexity of such problems, typically depend on many factors. Two such factors may include the number of qubits in the quantum processor and the connectivity between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative paths directly available to three other qubits, while in any particular application any number (i.e., 0, 1, 2, or 3) of those communicative paths may be employed. In a quantum processor employing coupling devices between qubits, this would mean a qubit having a connectivity of three is communicably directly coupleable to three other quits via three respective coupling devices. Traditionally, the number of qubits in a quantum processor limits the size of problems that may be solved and the connectivity between the qubits in a quantum processor limits the complexity of the problems that may be solved.

Examples of applications that employ the direct mapping approach include: US Patent Publication 2008-0052055, which describes solving a protein folding problem by first casting the protein folding problem as an Ising spin glass problem and then directly mapping the Ising spin glass problem to a quantum processor; U.S. Pat. No. 8,073,808, which describes solving a computational problem (e.g., an image-matching problem) by first casting the problem as a quadratic unconstrained binary optimization ("QUBO") problem and then mapping the QUBO problem directly to a quantum processor; and US Patent Publication 2011-0231462 (now U.S. Pat. No. 8,700,689), which describes solving logic circuit representations of computational problems by mapping each individual logic gate to a respective miniature optimization problem having an output that is "optimized" if the truth table of the logic gate is satisfied. In all of these examples, a problem is solved by first casting the problem in a contrived formulation (e.g., Ising spin glass, QUBO, etc.) because that particular formulation maps directly to the particular embodiment of the quantum processor. In other words, an intermediate formulation is used to re-cast the original problem into a form that accommodates the number of qubits and/or connectivity constraints in the particular quantum processor.

Techniques for performing direct mapping of a problem to a quantum processor (e.g., techniques generating for generating an intermediate formulation, such as a QUBO problem) are described in at least the following U.S. Pat. Nos. 7,418,283; 7,135,701; 7,788,192; 7,533,068; 8,008,942; 7,984,012; 8,244,662; 8,190,548; 8,174,305; and 8,700,689, each of which is incorporated herein by reference in its entirety.

The "direct mapping" approach of re-casting a problem in an intermediate formulation can work well for some problems but can also be impractical for other problems. For example, casting a computational problem as a QUBO problem requires casting the computational problem in a form allowing only pair-wise interactions between qubits. Any higher-order interactions need to be broken down into pair-wise terms in order to be re-cast in QUBO form. Many computational problems have higher-order (i.e., beyond pair-wise) interactions between variables, and these problems can require significant pre-processing in order to be re-cast in QUBO form. Furthermore, breaking down higher-order interactions into pair-wise terms can force multiple qubits to be used to represent the same variable, meaning the size of the problem that can be solved is reduced. It is for at least these reasons that the alternative "sampling approach" to programming quantum processors has been developed.

Sampling Approach

The sampling approach to programming a quantum processor is described in PCT Patent Application Serial No. PCT/US2012/045843 (WIPO publication WO2013006836), which is hereby incorporated by reference in its entirety.

In brief, the sampling approach to programming a quantum processor involves using a digital computer to define an objective function which takes, as input, a bit string (i.e., a sequence of 0s and 1s) and outputs a real number. The quantum processor is called to provide a set of bit strings, or "samples," where each bit in the bit string corresponds to the state of a respective qubit in the quantum processor after a quantum computation is performed. The quality of each sample is then assessed by plugging it into the objective function on the digital computer to determine the corresponding real number output. The quantum processor intrinsically provides samples from a probability distribution, where the shape of the probability distribution depends on a configuration of programmable parameters (i.e., the same programmable parameters that are used to define a QUBO in the direct mapping approach). High probability samples in the quantum processor's probability distribution may correspond to low-energy states of the quantum processor. In other words, the quantum processor may intrinsically tend to provide samples from low-energy states (e.g., by performing quantum annealing and/or adiabatic quantum computation).

The focus of the sampling approach to programming a quantum processor is to make these low-energy states of the quantum processor correspond to bit strings that produce desirable real number outputs in the objective function. This may be achieved by shaping the probability distribution of the quantum processor so that high-probability samples (e.g., low-energy states) correspond to bit strings that produce desirable real number outputs from the objective function. Thus, after the first samples from the quantum processor are assessed by determining their corresponding real number outputs, the programmable parameters of the quantum processor may be adjusted to re-shape the probability distribution of the quantum processor and increase the probability of producing desirable real number outputs and/or increase the desirability of at least some of the real number outputs produced.

Compared to the direct mapping approach, the sampling approach to programming a quantum processor is less dependent on the architecture of the processor itself and may enable a broader range of problems to be solved. In many applications, it can also be considerably more straightforward to program a quantum processor via the sampling approach than via the direct mapping approach.

BRIEF SUMMARY

Methods of formulating a problem comprising continuous variables into discrete variables that facilitate determining a solution via a quantum processor are described. Systems that perform the methods are also described.

A method of operation of a computational solver system to solve a continuous variable problem may be summarized as defining an objective function comprising a set of continuous variables via a digital computer; defining a number of integers to sample from the set of continuous variables via the digital computer; defining a number of bits used per integer and a cost matrix of neighboring integers via the digital computer; generating a mapping function via the digital computer, wherein the mapping function maps the set of continuous variables to a set of discrete variables; generating an objective function comprising the set of discrete variables via the digital computer; and solving the objective function comprising the set of discrete variables via a quantum processor.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
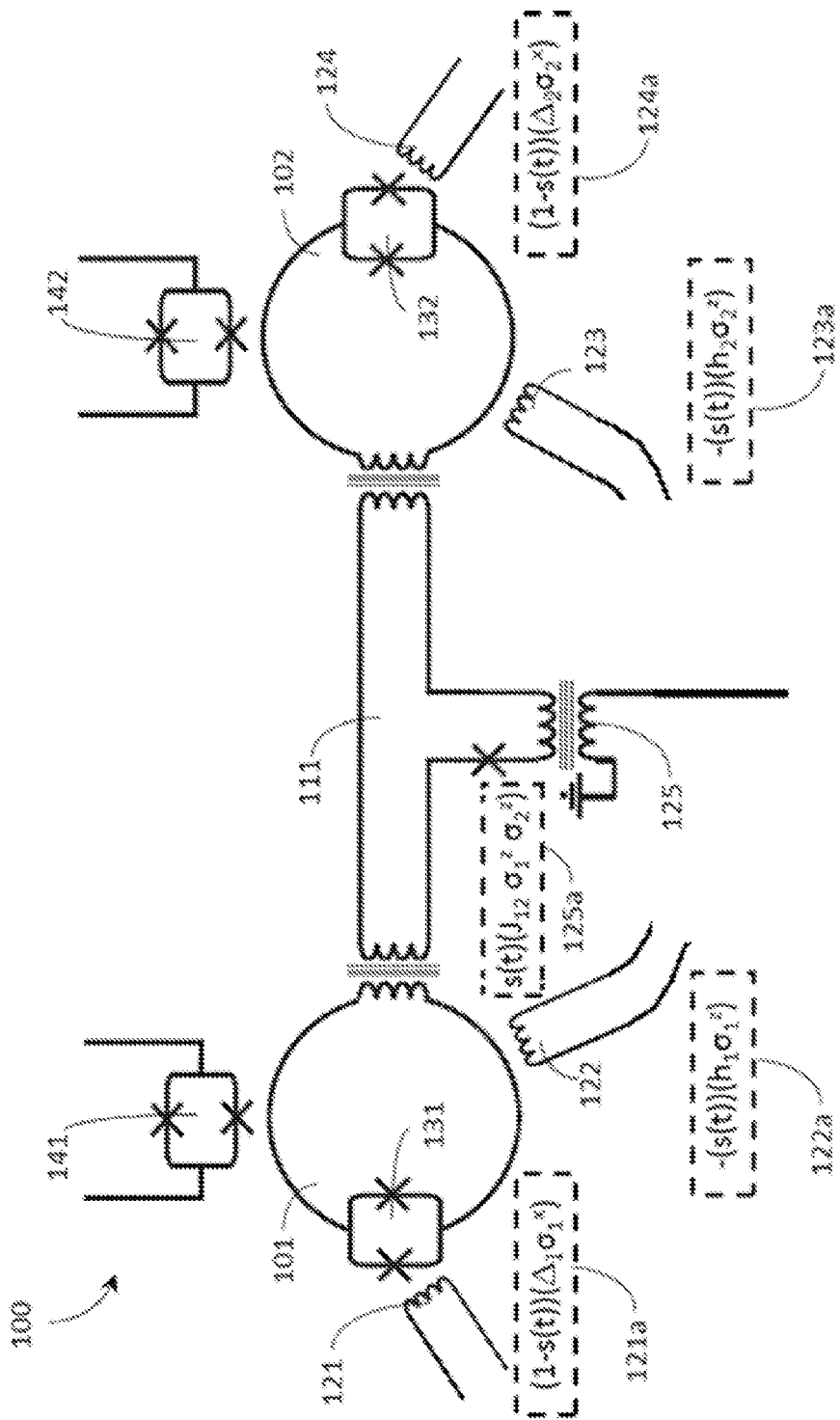
FIG. 1 is a schematic diagram of a portion of an exemplary superconducting quantum processor designed for AQC (and/or quantum annealing) that may be used to implement the present systems and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and non-transitory computer- or processor-readable media such as nonvolatile memory for instance read only memory (ROM), electronically erasable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for solving computational problems via a quantum processor. More specifically, the various embodiments described herein provide systems and methods provide systems and methods for defining how to encode problems for a quantum processor. Some examples of such problems include an objective function with non-binary variables. Examples of such problems include an objective function with continuous variables. Some examples include an objective function with integer variables.

A quantum processor typically comprises a number N of qubits. The "state" of the quantum processor is defined by the configuration of the respective states of all of the N qubits. Since each qubit output is a binary variable (in particular, at the end of a computation the state of each qubit is in a binary), the state of the quantum processor may be described by a bit string. Thus, each respective state of the quantum processor corresponds to a respective (and unique) bit string. A quantum processor typically operates by receiving a problem and returning a state, or bit string, that corresponds to a solution to the problem. This bit string has a finite length, typically equal to N. Thus, there are $2^N$ different configurations for this bit string, so the total number of possible outputs from (i.e., states of) the quantum processor is $2^N$.

Programming a quantum processor to solve a particular problem typically involves programming the quantum processor with a particular problem formulation and/or configuration of a number of programmable parameters. A quantum processor may include a number of programmable elements and/or parameters, and programming the quantum processor with a particular problem formulation and/or configuration of the number of programmable parameters may involve assigning specific values to these programmable elements and/or parameters. Typically, the values assigned to the programmable parameters are discrete (for example, 0/1, or −1/+1). However, a problem to be solved such as an objective function to be minimized may not always have such discrete set of values. In these instances a useful article is a computer readable mapping that converts the problem input to a discrete form. For example, in instances where the objective function comprises continuous values, there needs to be a mapping that converts the continuous variables into discrete form that allows the quantum processor to solve the problem. When the objective function comprises, or can be associated with integer values, there needs to be a mapping that converts the continuous variables into discrete form that allows the quantum processor to solve the problem. The present systems and methods provide, among other things, techniques for mapping continuous values of an objective function to integer values. The present systems and methods provide, among other things, techniques for mapping integer values of an objective function to discrete values (e.g., binary strings also called bit strings). The present systems and methods provide, among other things, techniques for using the mapping and the previously described sampling approach to minimize the objective function.

One of the challenges that one faces when minimizing an objective function, $F(X_1, X_2, \ldots, X_n)$, for integer $X_i$s using a solver that can only handle binary variables is how to map integer values to binary strings. The two contradicting properties that makes a mapping favorable are: 1) the number of bits required to map an integer to a binary string and 2) the change in the integer values by flipping a bit for an arbitrary state S. One can minimize the first property by representing each integer with its base-2 form, which requires log n bits. However, flipping more significant bits changes the integer values more and in the case of flipping the most significant bit, the change equals half the entire range.

For example, for a given objective function F(w) where w∈[0,3.1], w could be any number between 0 and 3.1 such as 1.1, 2.34, etc. In the case of w being a continuous value (e.g., a fraction), a user defines a finite set of integers that w may represent. The set of w values may be defined by an incremental set of numbers with a fixed increment Δ or the increment may be random with no fixed Δ. For this example, it is assumed that the set of w values have a fixed Δ of 0.1 such that a given w of function F(w) will have:

$w_i$={0, 0.1, 0.2, 0.3, . . . , 2.9, 3, 3.1}.

Each of the indices representing the values of w are called an "integer" (or in other words an "object") of w. As such, 0=integer 1, 0.1=integer 2, 3.1=integer 32. In order to represent the 32 integers shown above in base-2 form at least 5 bits are needed (i.e., for a binary representation $\log_2(32)=5$) so that integer 1 may be represented as 00001 and integer 16 may be represented as 01000. This form of representation of continuous variables is called binary representation which makes use of O(log k) bits.

Throughout this specification and the appended claims, reference is often made to a "neighborhood of a sample" and/or a "neighborhood of a state." The "neighborhood" of a sample (or state) is generally used to refer to a set of additional samples (or states) that are close to or within a vicinity of the sample (or state). For example, a sample that corresponds to a state of a quantum processor may correspond to a specific energy state of the quantum processor and the "neighborhood" of the sample may include other states of the quantum processor with respective energies that are within a certain range of the sample. Similarly, a sample that corresponds to a bit string may have a "neighborhood" that includes all other bit strings within a certain Hamming distance (i.e., within a certain number of bit flips) of the sample. For example, a bit string having N bits may have a neighborhood that includes all bit strings within a Hamming distance of 0.5N, 0.25N, 0.1N, 0.05N, etc. as appropriate for the specific application. In other examples, a bit string may have a neighborhood that includes all bit strings within an absolute value of Hamming distance such as, 1, 2, 3, 5, 10, etc. In the case of the minimization of an objective function, the objective function may include a number of low-value regions (i.e., minima or wells) corresponding to local minima and a lowest-value region corresponding to a global minimum. A well typically includes multiple low-value states, with the minimum (i.e., the base of the well) corresponding to the lowest-value state within the well. Thus, in this case the "neighborhood" of a sample may include the other samples within the same well (i.e., local or global minimum) as the sample.

However, in the example give above, a single bit flip may correspond to a completely different integer. For example, 00001 corresponds to integer 1 whereas flipping the second bit from left of 00001 being 01001 corresponds to integer 17 which may be completely different from integer 1. Therefore, in this case, the "neighborhood" of a sample may include sample from different wells. This kind of representation (i.e., binary representation) while uses minimum number of bits to represent a continuous variable function, may not have a smooth objective function to map to the quantum processor.

On the other hand, one can minimize the distance between the integers corresponding to a binary string and its one flip neighbor using the unary representation of integers at the cost of allocating k bits per integer. In other words, a mapping may be smoothed from bit strings mentioned above to integers by using more bits than is strictly necessary. In this way, one can tradeoff smoothness of the cost landscape with the number of variables. For example, the same continuous variable objective function F(w) as shown above may be represented a different base-2 representation, an example unary representation. For example, such a unary representation with 32 bits (i.e., on the order of O(k) bits) such that a 32-bit string of all zeros represents integer 0, a 32-bit string of 31 zeros and 1 ones represents integer 1, a 32-bit string of 12 zeros and 20 ones represents integer 20 and so on. With this kind of representation (i.e., unary representation), a bit flip at most introduce a 1 or remove a 1 which corresponds to a neighboring objects and as such the "neighborhood" of a sample may include the other samples within the same well, as opposed to binary representation of the objects. Therefore, in unary representation of objects, the objective function may be smoother than that of binary representation. However, there is an upper limit to the number of k-bits that may be used to represent an integer given the total number of integers. The upper limit is set by the hardware's available number of qubits that can be programmed with the k-bits defined. In some examples, the upper limit is proportional to the quotient from the division of the number of qubits by the number of integers. For example, a quantum processor comprising 500 available qubits may allow up to 10 bits to be used to represent an integer when the problem defined comprises 50 integers.

Therefore, the present systems and methods introduce an optimization procedure with tunable trade-off between the number of bits versus the smoothness of the landscape under a bit flip.

Throughout this specification, the term "hardware" is generally used to refer to a quantum processor. Thus, the phrases "in hardware" and "by the hardware" and the like generally refer to "via the quantum processor" and similar, as the context reasonably dictates.

Throughout this specification, the term "bit flip" is generally used to refer to changing bit in a bit string either from '0' to '1' or '1' to '0'. Depending on the mapping and the cost defined, a single bit flip may induce a large cost or a small cost which ultimately needs to be minimized.

In accordance with some embodiments of the present systems and methods, a quantum processor may be designed to perform quantum annealing and/or adiabatic quantum computation. An evolution Hamiltonian is proportional to the sum of a first term proportional to the problem Hamiltonian and a second term proportional to the disordering Hamiltonian. As previously discussed, a typical evolution may be represented by Equation 1:

$$H_E \propto A(t)H_D + B(t)H_P \tag{1}$$

where $H_D$ is the disordering Hamiltonian, $H_P$ is the problem Hamiltonian, $H_E$ is the evolution or instantaneous Hamiltonian, and A(t) and B(t) are examples of evolution coefficients which controls the rate of evolution. In general, evolution coefficients assume values from 0 to 1. A common disordering Hamiltonian is shown in Equation 2:

$$H_{In} = -\frac{1}{2}\sum_{i=1}^{N} \Delta_i \sigma_i^x \tag{2}$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. A common problem Hamiltonian includes first component proportional to diagonal single qubit terms and a second component proportional to diagonal multi-qubit terms. The problem Hamiltonian, for example, may be of the form:

$$H_P \propto -\frac{\varepsilon}{2}\left[\sum_{i=1}^{N} h_i \sigma_i^z + \sum_{j>i}^{N} J_{ij}\sigma_i^z\sigma_j^z\right] \tag{3}$$

where N represents the number of qubits, $\sigma_i^z$ is the Pauli z-matrix for the $i^{th}$ qubit, $h_i$ and $J_{i,j}$ are dimensionless local fields for the qubits and the couplings between qubits, and $\epsilon$ is some characteristic energy scale for $H_P$. Here, the $\sigma_i^z$ and $\sigma_i^z\sigma_j^z$ terms are examples of "diagonal" terms. The former is a single qubit term and the latter a two qubit term. Throughout this specification, the terms "final Hamiltonian" and "problem Hamiltonian" are used interchangeably. Hamiltonians such as $H_D$ and $H_P$ in Equations 2 and 3, respectively, may be physically realized in a variety of different ways. A particular example is realized by an implementation of superconducting qubits.

FIG. 1 is a schematic diagram of a portion of an exemplary superconducting quantum processor 100 designed for quantum annealing (and/or adiabatic quantum computing) that may be used to implement the present systems and methods. The portion of superconducting quantum processor 100 shown in FIG. 1 includes two superconducting qubits 101, and 102. Also shown is a tunable $\sigma_i^z\sigma_j^z$ coupling (diagonal coupling) via coupler 111 therebetween qubits 101 and 102 (i.e., providing pair-wise coupling or 2-local interaction). While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize quantum annealing and/or adiabatic quantum computing. Quantum processor 100 includes a plurality of interfaces 121-125 that are used to configure and control the state of quantum processor 100. Each of interfaces 121-125 may be realized by a respective inductive coupling structure, as illustrated, as part of a programming subsystem and/or an evolution subsystem. Such a programming subsystem and/or evolution subsystem may be separate from quantum processor 100, or it may be included locally (i.e., on-chip with quantum processor 100) as described in, for example, U.S. Pat. Nos. 7,876,248; and 8,035,540.

In the operation of quantum processor 100, interfaces 121 and 124 may each be used to couple a flux signal into a respective compound Josephson junction 131, 132 of qubits 101 and 102, thereby realizing the $\Delta_i$ terms in the system Hamiltonian. This coupling provides the off-diagonal $\sigma^x$ terms of the Hamiltonian described by Equation 2 and these flux signals are examples of "disordering signals." Similarly, interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of Equation 3. Furthermore, interface 125 may be used to couple a flux signal into coupler 111, thereby realizing the $J_{ij}$ term(s) in the system Hamiltonian. This coupling provides the diagonal $\sigma_i^z\sigma_j^z$ terms of Equation 3. In FIG. 1, the contribution of each of interfaces 121-125 to the system Hamiltonian is indicated in boxes 121a-125a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 121-125.

Throughout this specification and the appended claims, the term "quantum processor" is used to generally describe a collection of physical qubits (e.g., qubits 101 and 102) and couplers (e.g., coupler 111). The physical qubits 101 and 102 and the couplers 111 are referred to as the "programmable elements" of the quantum processor 100 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 122, 123, and 125) used to apply the programmable parameters (e.g., the $h_i$ and $J_{ij}$ terms) to the programmable elements of the quantum processor 100 and other associated control circuitry and/or instructions. As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" is used to generally describe the interfaces (e.g., "evolution interfaces" 121 and 124) used to evolve the programmable elements of the quantum processor 100 and other associated control circuitry and/or instructions. For example, the evolution subsystem may include annealing signal lines and their corresponding interfaces (121, 124) to the qubits (101, 102).

Quantum processor 100 also includes readout devices 141 and 142, where readout device 141 is configured to read out the state of qubit 101 and readout device 142 is configured to read out the state of qubit 102. In the embodiment shown in FIG. 1, each of readout devices 141 and 142 comprises a respective DC-SQUID that is configured to inductively couple to the corresponding qubit (qubits 101 and 102, respectively). In the context of quantum processor 100, the term "readout subsystem" is used to generally describe the readout devices 141, 142 used to read out the final states of the qubits (e.g., qubits 101 and 102) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO2012064974.

While FIG. 1 illustrates only two physical qubits 101, 102, one coupler 111, and two readout devices 141, 142, a quantum processor (e.g., processor 100) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In flux qubit the Josephson energy dominates or is equal to the charging energy. In a charge qubit it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf-SQUID qubits in Bocko, et al., 1997 *IEEE Trans. on Appl. Supercond.* 7, 3638; Friedman, et al., 2000, *Nature* 406, 43; and Harris, et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169. In some embodiments, the qubit is controlled by on chip circuitry. Examples of on-chip control circuitry can be found in U.S. Pat. Nos. 7,876,248; 7,843,209; 8,018,244; 8,098,179; 8,169,231; and US Patent Publication 2012-0094838.

Figure 2:
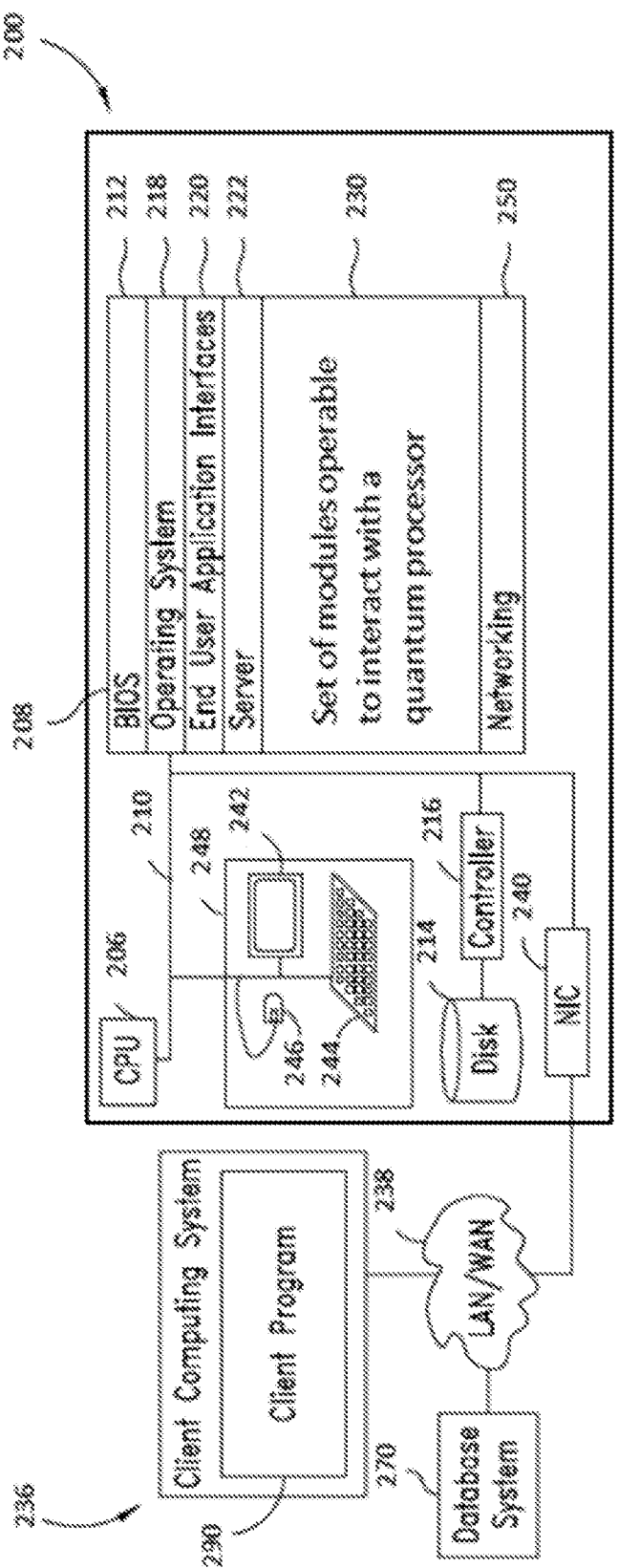
FIG. 2 illustrates an exemplary digital computer including a digital processor that may be used to perform classical digital processing tasks described in the present systems and methods.

FIG. 2 illustrates an exemplary digital computer 200 including a digital processor 206 that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like. The present systems and methods can also be practiced in distributed computing environments, where tasks or modules are performed by remote processing devices, which are linked through a communications network. In a distributed computing environment, program modules may be located in both local and remote memory storage devices.

Digital computer 200 may include at least one processing unit (i.e., digital processor 206), at least one system memory 208, and at least one system bus 210 that couples various system components, including system memory 208 to digital processor 206. Digital computer 200 will at times be referred to in the singular herein, but this is not intended to limit the application to a single digital computer 200. For example, there may be more than one digital computer 200 or other classical computing device involved throughout the present systems and methods.

Digital processor 206 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 2 are of conventional design. As a result, such blocks need not be described in further detail herein, as they will be understood by those skilled in the relevant art.

System bus 210 can employ any known bus structures or architectures, including a memory bus with a memory controller, a peripheral bus, and a local bus. System memory 208 may include non-volatile memory such as read-only memory ("ROM") and volatile memory such as random access memory ("RAM") (not shown). A basic input/output system ("BIOS") 212, which can form part of the ROM, contains basic routines that help transfer information between elements within digital computer 200, such as during startup.

Digital computer 200 may also include other non-volatile memory 214. Non-volatile memory 214 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 214 may communicate with digital processor 206 via system bus 210 and may include appropriate interfaces or controllers 216 coupled between non-volatile memory 214 and system bus 210. Non-volatile memory 214 may serve as long-term storage for processor-readable or computer-readable instructions, data structures, program modules and other data for digital computer 200. Although digital computer 200 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, Flash, ROMs, smart cards, etc.

Various sets of processor-readable instructions, called program modules, application programs and/or data can be stored in system memory 208. For example, system memory 208 may store an operating system 218, end user application interfaces 220 and server applications 222. In accordance with the present systems and methods, system memory 208 may store at set of modules 230 operable to interact with a quantum processor (not shown in FIG. 2).

System memory 208 may also include one or more networking applications 250, for example, a Web server application and/or Web client or browser application for permitting digital computer 200 to exchange data with sources via the Internet, corporate Intranets, or other networks, as well as with other server applications executing on server computers. Networking application 250 in the depicted embodiment may be markup language based, such as hypertext markup language ("HTML"), extensible hypertext markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 2 as being stored in system memory 208, operating system 218 and various applications/modules 220, 222, 230, 250 and other data can also be stored in nonvolatile memory 214.

Digital computer 200 can operate in a networking environment using logical connections to at least one client computer system 236 and at least one database system 270. These logical connections may be formed using any means of digital communication, for example, through a network 238, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 200 may be connected to the LAN through an adapter or network interface card ("NIC") 240 (communicatively linked to system bus 210). When used in a WAN networking environment, digital computer 200 may include an interface and modem (not shown), or a device such as NIC 240, for establishing communications over the WAN. Non-networked communications may additionally, or alternatively be employed.

In a networked environment, program modules, application programs, data, or portions thereof can be stored outside of digital computer 200. Those skilled in the relevant art will recognize that the logical connections shown in FIG. 2 are only some examples of establishing communications between computers, and other connections may also be used.

While digital computer 200 may generally operate automatically, an end user application interface 220 may also be provided such that an operator can interact with digital computer 200 through different user interfaces 248, including output devices, such as a monitor 242, and input devices, such as a keyboard 244 and a pointing device (e.g., mouse 246). Monitor 242 may be coupled to system bus 210 via a video interface, such as a video adapter (not shown). Digital computer 200 can also include other output devices, such as speakers, printers, etc. Other input devices can also be used, including a microphone, joystick, scanner, etc. These input devices may be coupled to digital processor 206 via a serial port interface that couples to system bus 210, a parallel port, a game port, a wireless interface, a universal serial bus ("USB") interface, or via other interfaces.

NIC 240 may include appropriate hardware and/or software for interfacing with the elements of a quantum processor (not shown). In other embodiments, different hardware may be used to facilitate communications between digital computer 200 and a quantum processor. For example, digital computer 200 may communicate with a quantum processor via a direct electrical connection (e.g., via Universal Serial Bus, Firewire, or the like), a wireless connection (e.g., via a Wi-Fi® network), or an Internet connection.

Client computer system 236 may comprise any of a variety of computing devices communicatively coupled to digital computer 200, and may include a client program 290 configured to properly format and send problems directly or indirectly to server application 222. Once digital computer 200 has determined a solution, server application 222 may be configured to send information indicative of this solution back to client program 290.

Figure 3:
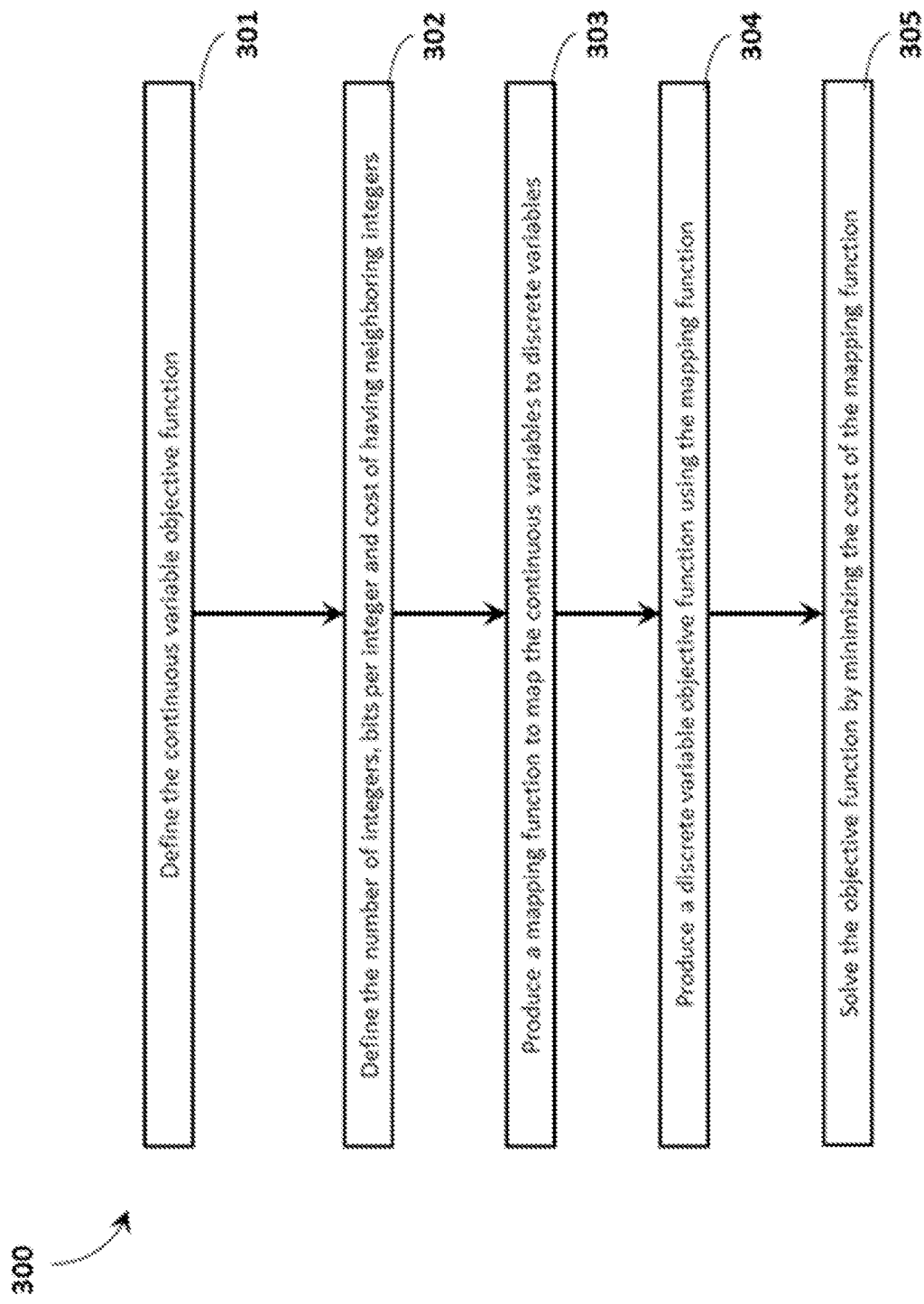
FIG. 3 is a flow diagram showing a method of solving a continuous variable objective function by producing a mapping function with discrete variables that maps the continuous variables into discrete variables solvable by the quantum hardware such that the cost of having neighboring integers is minimized.

FIG. 3 shows a method of solving a continuous variable objective function. The method 300 includes producing a mapping function with discrete variables that maps the continuous variables into discrete variables solvable by the quantum hardware. The method 300 includes producing a mapping function with integer variables that maps integer variables in to bit strings. These mapping functions are such that the cost of having neighboring integers is minimized.

Method 300 includes five acts 301-305, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments.

At 301, a continuous variable objective function is defined. The continuous variable objective function may be defined by a user via a digital computer in communication with the quantum processor. The quantum processor may only process discrete variables. As such, the continuous variables defined at 301 may need to be mapped to discrete variables in order to solve the objective function.

At 302, the number of integers, bits per integer, and the cost of having neighboring integers are defined. The number of integers, bits per integer, and the cost of having neighboring integers may be defined by a user via the digital computer. The number of integers may correspond to the number of objects to sample from the continuous variables defined in the objective function. For example, for a given continuous variable in the range [0,3.1], if the number of integers defined is 3, the 3 integers represent any 3 values taken from 0 to 3.1 such as 0.5, 1.5 and 2.5. That is integers 1, 2, and 3 are equated with values 0.5, 1.5 and 2.5. Bits per integer may correspond to the number of binary digits that the quantum processor is allowed to use to represent the 3 integers defined. For example, if the number of bits per integer is 3, the quantum processor may use 3 binary digits (bit strings) to represent the 3 integers. As such, '000', '001' and '010' may represent integer 1, '011', '100', '101' may represent integer 2 and '110', '111' may represent integer 3.

In some embodiments, along with the number of integers and bits per integer, a cost matrix, is also defined by the user via the digital computer. The cost matrix defines cost (i.e., penalty) for having neighboring integers representing a variable as defined in the objective function. For example, the cost of representing integer 1 by integer 1 may be 0 as the integer is correctly represented while the cost of represented integer 1 by integer 3 may be a non-zero user defined value such as 100.

Once steps 301 and 302 are complete, 303 produces a mapping function σ to map the continuous variable objective function into a discrete variable objective function that may be solvable via a quantum processor. In simplest form, producing the mapping function means determining which binary bit string(s) may represent which integer of 302. When producing the mapping function at least one constraint must be satisfied: at least one bit string may correspond to any integer defined at 302.

Given the settings of 302, the set of integer values $\{0, \ldots, n\}$ to be represented with k bits require at least $k_{min} = \lceil \log_2 n \rceil$ bits. Typically, k may be greater than $k_{min}$. The smoothness of the cost landscape can be measured by looking at how the integer values change when a single bit is flipped. This may be dependent on the original setting of the bits, so the average of all possible settings of the original bit string is computed. For example, let $\{b_0, \ldots, b_{2^{(k)}-1}\}$ label the possible bit strings and let σ(b) represent the integer that bit string $b_i$ is mapped to. We would like to identify a mapping σ such that σ(b)−σ(b) is small when the Hamming distance between b and b' is small. That is, when the distance between two variables in the objective function is small the Hamming distance between the bit string representation is small.

At 304, a discrete variable objective function is constructed with mapping σ through an optimization procedure. An example of discrete variable objective function is a summation over the entries of cost matrix corresponding to bit strings that are separated by a Hamming distance of one. The objective function produced and therefore needs to be minimized is:

$$G(\sigma(b_0), \sigma(b_1), \ldots, \sigma(b_{2^k-1})) = \sum_{\{(b_i,b_j)|H(b_i,b_j)=1\}} W_{|\sigma(b_i)-\sigma(b_j)|} \quad (4)$$

subject to:

$$\bigcup_i \sigma(b_i) = \{0, 1, \ldots, n-1\}. \quad (5)$$

That is, subject to having a binary string for every integer in the set of integer values. Here, $b_i$ is the base-2 representation of i using k bits, $H(b_i, b_j)$ is the Hamming distance of $b_i$ and $b_j$ and W is a user-defined cost matrix (e.g. a vector of costs), where $W_i$ is the cost of having two neighboring integers (integers for which the corresponding bit strings have Hamming distance 1) with absolute distance i. Here the optimization procedure to minimize the discrete variable objective function involves changing the mapping.

Based on the choice of W, one can enforce various forms of smoothness. For example, by setting:

$$W_i = \begin{cases} 0, & i = 0 \text{ or } i = 1 \\ (2^{k-1}k)^{i-2}, & i > 1 \end{cases} \quad (6)$$

the objective turns into minimizing the maximum absolute distance of neighboring integers. To prove this, note that for any i>1 in Equation 6, $W_{i+1}/W_i = 2^{k-1}k$ which is equal to the number of terms in the summation. Therefore, the cost of having a single pair of integers with absolute distance i is the same as the cost of having absolute distance i−1 all pairs. In words Equation 6 can be described as a piecewise function. The function is parameterized by the difference between integers (that is, absolute distance i). If the difference is zero or one the weight values are zero. If the difference is two or more the weight values are proportional to a positive value raised to the power of the difference minus two. In the example shown, the positive value is proportional to an exponential in the number of bits for each integer.

Table 1 shows example mapping from 7-bit strings of 0/1 s to integers 0 to 31. The four most significant bits are shown in rows and the three less significant bits are in columns. The bits in rows or columns are ordered from most significant in left to less significant in right:

TABLE 1

|      | 000 | 001 | 010 | 011 | 100 | 101 | 110 | 111 |
|------|-----|-----|-----|-----|-----|-----|-----|-----|
| 0000 | 16  | 14  | 14  | 13  | 14  | 13  | 13  | 12  |
| 0001 | 17  | 15  | 15  | 13  | 15  | 13  | 13  | 11  |
| 0010 | 14  | 13  | 13  | 12  | 13  | 12  | 12  | 10  |
| 0011 | 15  | 13  | 13  | 11  | 13  | 11  | 11  | 9   |
| 0100 | 14  | 13  | 13  | 12  | 13  | 12  | 12  | 10  |
| 0101 | 15  | 13  | 13  | 11  | 13  | 11  | 11  | 9   |
| 0110 | 13  | 12  | 12  | 10  | 12  | 10  | 10  | 8   |
| 0111 | 13  | 11  | 11  | 9   | 11  | 9   | 8   | 7   |
| 1000 | 17  | 15  | 25  | 13  | 15  | 13  | 26  | 11  |
| 1001 | 19  | 17  | 18  | 15  | 17  | 15  | 20  | 13  |
| 1010 | 15  | 13  | 28  | 11  | 13  | 11  | 29  | 9   |
| 1011 | 17  | 15  | 1   | 0   | 15  | 13  | 3   | 2   |
| 1100 | 15  | 13  | 23  | 11  | 13  | 11  | 24  | 9   |
| 1101 | 18  | 15  | 21  | 13  | 15  | 13  | 22  | 11  |
| 1110 | 13  | 11  | 30  | 9   | 11  | 9   | 27  | 6   |
| 1111 | 15  | 13  | 31  | 11  | 13  | 11  | 5   | 4   |

The mapping σ needs to be created such that a bit flip of a bit string may not significantly impact σ. In other words, the mapping σ may need to be smooth. Therefore, smoothness needs to be defined before producing σ. For example, suppose that i=σ(b) where i is the smoothness parameter and b is a vector of bit strings. In order for mapping to be "smooth", a small change in b (i.e., Δb) should result in no or small change in i (i.e., Δi). The significance of Δi is a user-defined parameter which is referred to as "cost." Cost is a penalty applied to a bit flip in b which defines "how bad" a bit flip may be. Suppose there are 3 integers defined integer 1, integer 5 and integer 7. These integers could represent 3 continuous variables in the original optimization problem. One computes the distance between integer 1 and integer 1 as 0, integer 1 and integer 5 as 4, integer 1 and integer 7 as 6 and integer 5 and integer 7 as 2. For each of the distances computed, the user defines the cost/penalty applied. For example, when distance is 0 the cost may be 0, when the distance is 2 the cost may be 20, when the distance is 4 the cost may be 100 and when the distance is 6 the cost may be 1000. For a mapping a created, Equation 6 adds all the costs for all the bits associated with all the bit flips and reiterates with a new mapping a to minimize the objective function.

At 305, the objective function of 304 (i.e., Equation 6) is solved. The objective function may be solved by a local search, such as a specialized tabu search that only searches in the feasible space. A tabu search includes maintaining a tabu list (list of options that are not possible) and thus the search space is reduced. Items are removed from the tabu list after a set amount of time, known as tenure has expired. The search starts from a random assignment. In each iteration, all possible swaps of assignments are checked and the non-tabu swap with the lowest value is chosen, unless the lowest value is the best value so far in which case that swap is chosen independent of its tabu status. The chosen swap is added to the tabu list (if it is not already in the list). The iteration continues until a termination condition is met. Hence, the final objective function solved only takes into account the relative difference of $\Delta i$ rather than the actual continuous values presented by the continuous variable optimization function.

The optimization function may terminate once a certain smoothness criteria is satisfied, the number of iterations have exhausted, or once the tabu search algorithm has timed out. If the tabu search algorithm fails to provide a desirable output, the mapping function may be modified and the algorithm may be restarted.

Although, at 305, a specialized tabu search is used to solve the objective function, many other specialized searches may be used for solving optimizations such as the objective function at 305. Such searches may include, among other searches, iterative searches, local searches, a simulated annealing based search, a path-relinking algorithm, or a generic algorithm.

Although the cost W is given as a user-defined matrix of penalties, in alternative embodiments, the cost W may be programmed via a digital computer given the number of integers and bits per integer.

The various embodiments described herein provide systems and methods for solving a continuous variable objective function by mapping the continuous variables into discrete variables and minimizing the cost of neighboring integers (i.e., bit flips) by iteratively sampling from a probability distribution (i.e., the mapping function), evaluating the relative quality (e.g., relative value when a minimum value is sought) of the samples with respect to an objective function, and re-shaping the probability distribution to probabilistically provide more high quality samples (i.e., more samples corresponding to low values of the objective function) until, for example, the samples converge on a solution to the computational problem. Using this approach, a quantum processor may be used to solve a computational problem with continuous variables without ever having to map the computational problem itself directly to the quantum processor. Instead, the quantum processor is used as a sample generator providing samples from a probability distribution, the samples being the mapping function that maps the continuous variables of the original computational problem/objection function into discrete integers/bit strings and the probability distribution of the quantum processor is iteratively adjusted until, for example, the high probability states of the quantum processor converge on bit strings that correspond to low values of the objective function defined by the mapping cost of the mapping function.

As the probability distribution of the quantum processor begins to develop high probability regions in the neighborhoods of bit strings that correspond to low values of the objective function, more and more samples may inherently be drawn from these high probability regions providing bit strings that correspond to lower and lower values of the objective function until, for example, the bit strings converge on a minimum value of the objective function (or until a pre-determined number of iterations or computation time is completed). Furthermore, classical (i.e., "non-quantum") processing techniques may be employed to explore other states in the neighborhood of any sample from the quantum processor and/or to explore states in between samples from the quantum processor and/or to program the quantum processor to generate samples from a specific space.

Since it is not necessary to map the computational problem itself directly to the quantum processor, the various embodiments described herein can greatly simplify the use of a quantum processor in solving a computational problem. In the present systems and methods, a user requires no knowledge of the operation of the quantum processor itself and may simply treat the quantum processor as a "black box" source of samples. In other words, the user does not need to learn to formulate their problem in terms of the $h_i$ and $J_{ij}$ programmable parameters of the quantum processor (i.e., the machine language of the quantum processor). Rather, the user may only need to formulate their objective function so that it receives bit strings as inputs and returns numeric values as outputs, the number of integers to be taken from the objective function, bits per integer and the cost of having neighboring integers.

The various embodiments described herein provide systems and methods for interacting with quantum processors. More specifically, the various embodiments described herein provide systems and methods for solving continuous variable objective functions which are often encountered in the field by converting the continuous variables into discrete bit strings that the quantum processor is able to receive and solving the modified objective function using a classical digital computer to communicate with a quantum processor via a multi-level software architecture comprising a set of modules, where at least one of the modules abstracts away from the machine language of the quantum processor to enable a user to employ familiar programming techniques to interact with the quantum processor.

In the various embodiments described herein, a digital computer (e.g., classical or digital computer 200) may be used to interact with a quantum processor. A quantum processor may include a number of programmable elements, and interacting with a quantum processor may include programming the quantum processor with a particular problem formulation and/or configuration of programmable parameters by assigning specific values to these programmable elements. Interacting with a quantum processor may also include evolving the quantum processor (e.g., performing quantum annealing and/or adiabatic quantum computation) to determine a solution to the particular problem and reading out the solution from the quantum processor.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, International (PCT) patent applications referred to in this specification and/or listed in the Application Data Sheet, including U.S. Provisional Application Ser. No. 61/824,881, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-transitory computer-readable storage medium containing processor-executable instructions, which when executed cause at least one digital processor to:
receive a first objective function comprising a plurality of non-binary variables;
receive a plurality of integers which represent the plurality of non-binary variables;
define or receive a number of bits used per integer in the plurality of integers proportional to a quotient from division of a number of qubits in a quantum computer by the number of integers in the plurality of integers, wherein the quantum computer is communicatively coupled to the at least one digital processor;
receive a cost matrix comprising a number of values for a number of neighboring integers in the plurality of integers;
generate a mapping function, wherein the mapping function maps the plurality of integers to a plurality of bit strings and each bit string comprises the number of bits used per integer;
generate a second objective function comprising a sum over the values for the neighboring integers in the cost matrix wherein the neighboring integers correspond to bit strings that are separated by a Hamming distance of one;
minimize the second objective function;
generate a third objective function comprising a subset of the plurality of bit strings;
send the third objective function to the quantum computer;
solve the third objective function via the quantum computer; and
receive a solution to the third objective function from the quantum computer.

2. The computer-readable storage medium of claim 1 wherein the plurality of non-binary variables comprises a set of continuous variables.

3. The computer-readable storage medium of claim 2 wherein the instructions when executed cause the at least one digital processor further to:
draw a sample from the set of continuous variables; and
define the plurality of integers as indices to the sample drawn from the set of continuous variables.

4. The computer-readable storage medium of claim 1 wherein the cost matrix comprises values defined in a piecewise way, parameterized by a difference between the neighboring integers, where if:

the difference is zero or one the values are zero; and
the difference is two or more the values are proportional to a positive value raised to the power of the difference minus two.

5. The computer-readable storage medium of claim 1 wherein the instructions when executed cause the at least one digital processor further to:
run a tabu search to minimize the second objective function.

6. The computer-readable storage medium of claim 1 wherein the instructions when executed cause the at least one digital processor further to:
run a search selected from the group consisting of: a local search, an iterative search, a simulated annealing search, a path-relinking algorithm, and a generic algorithm.

7. A method of operation of a computational solver system to solve a continuous variable problem, the method comprising:
defining a first objective function comprising a set of continuous variables via a digital computer;
defining a number for a plurality of integers to sample from the set of continuous variables via the digital computer;
defining a number of bits used per integer in the plurality of integers via the digital computer, wherein the number of bits used per integer is proportional to a quotient from division of a number of qubits in a quantum computer by the number of integers in the plurality of integers, and wherein the quantum computer is communicatively coupled to the digital computer;
defining a cost matrix of neighboring integers via the digital computer;
generating a mapping function via the digital computer, wherein the mapping function maps the set of continuous variables to a set of discrete variables and each discrete variable comprising the number of bits used per integer;
generating an objective function comprising neighboring integers in the cost matrix wherein the neighboring integers correspond to a pair of discrete variables in the set of discrete variables that are separated by a Hamming distance of one;
minimizing the second objective function via the digital computer;
generating a third objective function comprising the set of discrete variables via the digital computer; and
solving the third objective function via the quantum computer.

8. The method of claim 7 wherein the cost matrix comprises values defined in a piecewise way, parameterized by a difference between the neighboring integers, where if:
the difference is zero or one the values are zero; and
the difference is two or more the values are proportional to a positive value raised to the power of the difference minus two.

9. The method of claim 7 wherein minimizing the second objective function via the digital computer, includes:
running a tabu search.

10. The method of claim 7 wherein minimizing the second objective function via the digital computer includes running a search selected from the group consisting of: local search, an iterative search, a simulated annealing search, a path-relinking algorithm, and a generic algorithm.

11. The method of claim 7 wherein the set of discrete variables are bit strings and generating a mapping function includes generating the mapping function that maps the plurality of integers to a set of bit strings.

12. A hybrid computational system, the system comprising:
- a digital computer comprising at least one digital processor and at least one nontransitory processor-readable medium communicatively coupled with the at least one digital processor, and which in operation:
  - receives a first objective function comprising a plurality of non-binary variables,
  - receives a plurality of integers which represent the plurality of non-binary variables,
  - receives a cost matrix comprising values for a number of neighboring integers in the plurality of integers,
  - generates a mapping function, wherein the mapping function maps the plurality of integers to a plurality of bit strings,
  - generates a second objective function comprising a sum over the values for the neighboring integers in the cost matrix wherein the neighboring integers correspond to bit strings that are separated by a Hamming distance of one,
  - minimizes the second objective function, and
  - creates a third objective function comprising a subset of the plurality of bit strings;
- a quantum processor which in operation solves a continuous variable problem; and
- a communication channel which in operation communicatively couples the digital computer to the quantum processor, wherein the digital computer defines a number of bits used per integer in the plurality of integers proportional to a quotient from division of a number of qubits in the quantum processor by the number of integers in the plurality of integers and each bit string comprises the number of bits used per integer, and wherein the quantum processor in operation:
  - receives the third objective function from the digital computer, and
  - creates a solution to the third objective function.

13. The system of claim 12 wherein the quantum processor provides a source of samples to the third objective function.

* * * * *